United States Patent [19]

Bonnet et al.

[11] Patent Number: 4,826,623
[45] Date of Patent: May 2, 1989

[54] HOMOGENEOUS MICROEMULSION COMPOSITIONS BASED ON HALOGENATED POLYHYDROXYLATED COMPOUNDS AND HALOGENATED ALKANES AND THEIR APPLICATION TO THE MANUFACTURE OF RIGID FOAMS

[75] Inventors: Evelyne Bonnet, Lamorlaye; François Tilquin, Cormeilles en Parisis, both of France

[73] Assignee: Atochem, France

[21] Appl. No.: 761,579

[22] Filed: Aug. 1, 1985

[30] Foreign Application Priority Data

Aug. 22, 1984 [FR] France ................................ 84 13054

[51] Int. Cl.[4] .......................... B01J 13/00; C09K 3/00
[52] U.S. Cl. .................................... 252/308; 252/312; 252/609; 252/610; 252/182.15; 252/182.24
[58] Field of Search ............... 252/308, 312, 609, 610, 252/182, 182.15, 182.24

[56] References Cited

U.S. PATENT DOCUMENTS

| 3,213,052 | 10/1965 | Lowes | 524/417 |
|---|---|---|---|
| 3,305,497 | 2/1967 | Stallings et al. | |
| 3,630,973 | 12/1971 | Ardis et al. | 521/176 |
| 3,700,625 | 10/1972 | Brady | 252/609 X |
| 3,778,408 | 12/1973 | Burns | 524/712 |
| 3,997,449 | 12/1976 | Wilkinson | 252/8.1 |
| 4,072,638 | 2/1978 | Boulet et al. | 521/126 |
| 4,076,630 | 2/1978 | Smith | 252/8.1 |
| 4,146,499 | 3/1979 | Rosano | 252/186 |
| 4,173,710 | 11/1979 | Boulet et al. | 521/126 |
| 4,225,453 | 9/1980 | De Paul et al. | 252/610 X |
| 4,260,514 | 4/1981 | Foucht | 252/182 |
| 4,405,761 | 9/1983 | Rodgers et al. | 525/404 |
| 4,436,855 | 3/1984 | Higgins et al. | 524/145 |
| 4,511,688 | 4/1985 | Termine et al. | 252/609 X |

FOREIGN PATENT DOCUMENTS

| 330468 | 7/1976 | Austria . | |
| 2083540 | 12/1971 | France . | |
| 2180138 | 11/1973 | France . | |
| 30905 | 8/1974 | Japan | 252/610 |
| 1073276 | 2/1984 | U.S.S.R. . | |
| 821342 | 10/1959 | United Kingdom . | |

Primary Examiner—Matthew A. Thexton
Assistant Examiner—Catherine S. Kilby
Attorney, Agent, or Firm—Sigalos, Levine & Montgomery

[57] ABSTRACT

A stable homogeneous composition in the form of a microemulsion suitable for making rigid foams comprising a halogenated polyhydroxylated compound, a halogenated alkane, and a surfactant in an amount sufficient to maintain a stable microemulsion.

3 Claims, No Drawings

HOMOGENEOUS MICROEMULSION COMPOSITIONS BASED ON HALOGENATED POLYHYDROXYLATED COMPOUNDS AND HALOGENATED ALKANES AND THEIR APPLICATION TO THE MANUFACTURE OF RIGID FOAMS

BACKGROUND OF THE INVENTION

The present invention relates to homogeneous compositions used in the manufacture of rigid polyurethane and/or polyisocyanurate foams and, more particularly, foams used in areas which require a good fire resistance such as decorations, buildings, or vehicles. The object of the invention concerns homogeneous compositions of halogenated polyhydroxylated compounds and halogenated alkanes kept in the form of a microemulsion by means of a surfactant.

For the manufacture of rigid polyurethane and/or polyisocyanurate foams having a good fire resistance, it is known to use polyhydroxylated halogenated compounds having a good reactivity with respect to isocyanates. For this kind of application, one prefers polyhydroxylated compounds of low molecular weight possessing at least two hydroxyl groups per molecule, but preferably 3 or 4, and a hydroxyl value at least equal to 250, but preferably between 300 and 600. Moreover, in order to obtain rigid foams having good fire-resistant properties; i.e., oxygen limit index (LOI) values, according to standard NF 51.071, above 26 and, better still, above 28, it is recommended to use halogenated polyols having a halogen content and more particularly, a bromine content as high as possible and preferably from 35 to 45% by weight. Such compounds are described in numerous patents such as, for instance, in French Pat. Nos. 1,350,425, 2,180,138, 1,401,803, 2,229,680, as well as in U.S. Pat. No. 3,385,900. They are likewise described in the literature such as, for example, in Flame Retardancy of Polymeric Materials, vol. 3, edited by W. C. KURYLA and A. J. PAPA, concerning, in particular, the fireproofing of polyurethane foams.

These rigid foams are obtained by the reactions of at least one polyhydroxylated halogenated compound with a polyisocyanate in the presence of a foaming agent. These foaming agents are selected from the family of halogenated alkanes, generally chlorinated and/or fluorinated, containing from 1 to 3 atoms of carbon such as, for example, methylene chloride or the Freons like trichlorofluoromethane, dichlorodifluoromethane, or trichlorotrifluoromethane. The incorporation of these halogenated alkanes into the formulations for rigid foams is not easy because of their incompatibility with the mixture of the other constituents, which results in a poor emulsification of the constituents of the mixture and most often a very rapid separation of the foaming agent. This phenomenon is observed in particular in the formulations based on polyols of low molecular weight, highly halogenated and weakly oxyalkylenated, above all the weakly oxypropylenated polyols or polyols not oxypropylenated at all. With such a heterogeneous system most often involving the separation of the basic constituents and the foaming agent, it is difficult to fabricate rigid foams of good quality because of the lack of uniform distribution of the effects of each of the constituents. The technological behavior of the systems thus constituted is not satisfactory.

SUMMARY OF THE INVENTION

The present invention remedies the above-noted drawbacks to provide stable and homogeneous compositions from which the foaming agent does not separate.

Briefly, the present invention comprises stable, homogeneous emulsion compositions comprising a halogenated polyhydroxylated compound, a halogenated alkane, and a surfactant in an amount sufficient to maintain a stable emulsion. The invention also comprises the method of making rigid polyurethanes and/or polyisocyanurate foams comprising reacting a polyisocyanate with one of such stable compositions.

DETAILED DESCRIPTION

The surfactants useful according to the present invention are selected from the non-ionic surfactants, ionic surfactants; namely, anionic or cationic, or of amphoteric surfactants. Among the non-ionic surfactants, the classes of preferred products are non-ionic surface agents with ether bonds such as polyoxyethylenated alkylphenols and polyoxyethylenated alcohols, and non-ionic surface agents which are copolymers of alkylene oxides. Among the non-ionic surface agents with an ether bond such as polyoxyethylenated alkylphenols, a class of preferred products is the series of polyethoxylenated monylphenols with preferably a mean number n of ethylene oxide configurations per nonylphenol configuration of between 1.5 and 20. In the family of polyoxyethylenated alcohols, the preferred alcohols are of the ethylhexanol type or synthetic alcohols with a carbon chain of $C_{13}-C_{15}$, $C_9-C_{11}$ with preferably a mean number n of ethylene oxide configurations per alcohol configuration of between 2 and 25. Among the non-ionic surface agents which are copolymers of alkylene oxides, a class of preferred products comprises the products of the series of the copolymers of propylene oxide and ethylene oxide, ethylene glycol and propylene glycol. Among the surface agents derived ionic from the non-ionic, a preferred class of products comprises the family of phosphates of ethoxylated alcohols. Among the ionic surface agents, a preferred class of products is constituted of the family of sulfonates such as mineral oil sulfonates or sodium alkylarylsulfonates.

The selection of the surfactant does not depend directly on well-established rules, but on an approach derived from known concepts, accessible to the expert, of HLB (hydrophilic-lipophilic balance) and of required HLB introduced by GRIFFIN (The HLB System-notice ICI 1976), as well as of EACN (Equivalent Alcane Carbon Number) introduced by SCHECHTER (University of Austin-Texas-Annual Report 1975). These concepts are directly linked to the structure of the basic constituents like the halogenated polyhydroxylated compound, the supplementary fire-resistant agent possibly added such as the phosphated or phosphohalogenated additives, and the foaming agent. These concepts are likewise linked to the proportion of each of the constituents of the composition. The most desired surfactant for each particular mixture of halogenated polyhydroxylated compound and halogenated alkane can be readily determined by routine experimentation utilizing the known concepts set forth above. In like manner the amount of surfactant to be used can be routinely determined; with only about up to about 10 parts by weight of surfactant being required to maintain a stable composition.

The halogenated polyhydroxylated compounds and halogenated compounds used and the proportions thereof are those conventionally used in the manufacture of rigid polyurethane and/or polyisocyanurate foams.

As used herein, the term "microemulsion" means that the particles of each constituent of the emulsion are of a small size. This coupled with the homogeneous nature and stability of the emulsions makes them capable of reacting with a polyisocyanate to form rigid foams of excellent quality.

These novel microemulsion compositions can be utilized to make rigid polyurethane or polyisocyanate foams by reacting them with a polyisocyanate utilizing conventional proportions, temperatures, and other reaction conditions.

The compositions according to the invention are particularly suitable to the manufacture of rigid foams from diphenylmethane-4,4'-diisocyanate (MDI) and/or from polymethylenepolyphenylisocyanate (PMPI).

Simple agitation is all that is required to obtain a stable homogeneous composition from which the individual components which will not separate; including other components that can be added such as catalysts, water, compounds to ensure dimensional stability of the final foamed product, or supplementary fireproofing agents such as phosphated or phosphohalogenated additives commonly used for this purpose. Such stable homogeneous emulsions can even be obtained when highly halogenated polyols or sparsely oxypropylenated, halogenated polyol polyethers; which are particularly appropriate for the manufacture of rigid polyurethane and/or polyisocyanurate foams, are used by simply utilizing a few parts by weight of surfactant.

In order to accelerate the reaction of formation of the foam, any known catalyst can be added to the reaction mixture, selected, for instance, from among the amines and metallic salts and, more particularly from among the N-alkylamines, N-alkylmorpholines, the potassium or sodium salts like the acetate, the tin salts like stannous octoate, dibutyltin diacetate, and dibutyltin dilaurate.

One can likewise add to the reaction mixture agents making it possible to ensure the dimensional stability of the foam during the course of expansion, among the best known and the most used agents one can cite the organic compounds of silicon like the silicon polyethers.

The microemulsions obtained, stable and non-separating, make possible an easy implementation, a more rapid mixing of the constituents, a better emulsification, and improved fluidity of the mixture, a shorter drying time of the foam after expansion and, in a general manner, better physical-chemical properties of the cellular materials obtained.

This inventions will be further described in connection with the following examples which are set forth for purposes of illustration only.

EXAMPLE 1

There is mixed with 90 g of a halogenated polyhydroxylated compound obtained by the addition of brominated glycidic alkyl ether and of epichlorohydrin to glycerin and possessing the following characteristics:
OH groups/kg=7
Mean molecular weight $\overline{Mn}=430$
% Br by weight=32.2
% Cl by weight=8.1
10 g of trichloroisopropyl phosphate and 10 g of ethoxylated nonylphenol containing 1.5 OE (ethylene oxide).

Homogenation takes place and then there is added 30 g of trichlorofluoromethane (Freon 11) and a stable microemulsion is obtained by simple agitation.

EXAMPLE 2

There is mixed with 90 g of a halogenated polyhydroxylated compound obtained by the addition of brominated glycidic allyl ether to glycerin and possessing the following characteristics:
OH groups/kg=6
Mean molecular weight $\overline{Mn}=500$
% Br by weight 45.1
10 g of trichloroisopropylphosphate and of 10 g of nonylphenol ethoxylated with 1.5 OE (ethylene oxide). Homogenization takes place and then there is added 30 g of trichlorofluoromethane, and by means of simple agitation a stable microdispersion is obtained.

EXAMPLE 3

There is mixed with 90 g of the halogenated polyhydroxylated compound of Example 1, 10 g of dimethylmethylphosphate and 10 g of neopentylglycol ethoxylated with 20 OE (ethylene oxide). Homogenization takes place and then there is added 30 g of trichlorofluoromethane, and by means of simple agitation a stable microdispersion is obtained.

EXAMPLE 4

There is mixed with 90 g of a halogenated polyhydroxylated compound (IXOL B 251) possessing the following characteristics
OH groups/kg=5.9
% Br by weight=32
% Cl by weight=6.5
10 g of dimethylmethyl phosphonate and 10 g of neopentylglycol ethoxylated with 7 OE (ethylene oxide). Homogenization takes place and then 30 g of trichlorofluoromethane are added. A stable microemulsion is obtained by simple agitation.

EXAMPLE 5

There is mixed with 90 g of the halogenated polyhydroxylated compound of Example 2, 10 g of dimethyl methylphosphonate and of 10 g of a polyethoxylated monoalcohol having a carbon chain containing $C_{13}-C_{15}$ with 2 ethylene oxide configurations. Homogenization takes place and then 30 g of trichlorofluoromethane are added. A stable microemulsion is obtained by simple agitation.

EXAMPLE 6

There is mixed with 90 g of the halogenated polyhydroxylated compounds of Example 1, 10 g of trichloroisopropyl phosphate and 10 g of a polyethoxylated monoalcohol having a carbon chain containing $C_{13}-C_{15}$ with 7 ethylene oxide configurations. Homogenization takes place and then 30 g of trichlorofluoromethane are added. A stable microemulsion is obtained by simple agitation.

EXAMPLE 7

There is mixed with 90 g of the halogenated polyhydroxylated compound of Example 4, 10 g of methyl methylphosphonate and 10 g of a polyethoxylated monoalcohol having a carbon chain containing $C_{13}-C_{15}$ with 25 ethylene oxide configurations. Homogenization takes place and then 30 g of trichlorofluoromethane are added. A stable microdispersion is obtained by simple agitation.

EXAMPLE 8

There is mixed with 90 g of the halogenated polyhydroxylated compound of Example 4, 10 g of trichloroisopropylphosphate and 10 g of polyoxyethaythylenated monoalcohol having a carbon chain containing $C_9$–$C_{11}$ with 6 ethylene oxide configurations Homogenization takes place and then 30 g of trichlorofluoromethane are added. A stable microemulsion is obtained by simple agitation.

EXAMPLE 9

There is mixed with 90 g of the halogenated polyhydroxylated compound of Example 2, 10 g of trichloroisopropylphosphate and 10 g of an oxyethylenated alcohol having a carbon chain containing $C_9$–$C_{11}$ with nine ethylene oxide configurations. Homogenization takes place and then 30 g of trichlorofluoromethane are added. A stable microemulsion is obtained by simple agitation.

EXAMPLE 10

There is mixed with 90 g of the halogenated polyhydroxylated compound of Example 4, 5 g of oxyethylenated ethylhexanol with 4.5 ethylene oxide configurations. Homogenization takes place and then 30 g of trichlorofluoromethane are added. A stable microemulsion is obtained by simple agitation.

EXAMPLE 11

There is mixed with 90 g of the halogenated polyhydroxylated compound of Example 1, 10 g of dimethylmethylphosphonate and 10 g of oxyethylenated ethylhexanol with 10 ethylene oxide configurations. Homogenization takes place and then 30 g of trichlorofluoromethane are added. A stable microemulsion is obtained by simple agitation.

EXAMPLE 12

There is mixed with 90 g of the halogenated polyhydroxylated compound of Example 4, 10 g of dimethyl methylphosphonate and 10 g of the phosphate of a monoalcohol having a carbon chain containing $C_{13}$–$C_{15}$ oxyethylenated with 7 ethylene oxide configurations. Homogenization takes place and then 30 g of trichlorofluoromethane are added. A stable microemulsion is obtained by simple agitation.

EXAMPLE 13

There is mixed with 90 g of the halogenated polyhydroxylated compound of Example 4, 10 g of dimethyl methyl phosphonate and 5 g of propoxylenated and oxyethylenated propyleneglycol of a molecular weight of the order of 1800 g with an ethylene oxide ratio of 50% (PLURONIC L 35). Homogenation takes place and then 30 g of trichlorofluoromethane are added. A stable microemulsion is obtained by simple agitation.

EXAMPLE 14

There is mixed with 90 g of the halogenated polyhydroxylated compound of Example 2, 10 g of trichloroisopropyl phosphate and 5 g of propoxylenated and oxyethylenated propylene glycol of a molecular weight of the order of 4300 g with an ethylene oxide ratio of 30% (PLURONIC P 103). Homogenization takes place and then 30 g of trichlorofluoromethane are added. A stable microemulsion is obtained by simple agitation.

EXAMPLE 15

There is mixed with 90 g of the polyhydroxylated compound of Example 4, 10 g of dodecylbenzene sulfonate. Homogenization takes place and then 30 g of trichlorofluoromethane are added. A stable microemulsion is obtained by simple agitation.

EXAMPLE 16

There is mixed with 90 g of the polyhydroxylated compound of Example 4, 10 g of dimethylmethylphosphonate and 10 g of isotridecanol oxypropylenated with 5 propylene oxide configurations. Homogenization takes place and then 30 g of trichlorofluoromethane are added. A stable microemulsion is obtained by simple aiitation.

EXAMPLE 17

There is mixed with 90 g of the halogenated polyhydroxylated compound of Example 4, 10 g of the trichloroisorropylphosphate and 10 g of isotridecanol oxypropylenated with 5 propylene oxide configurations. Homogenization takes place and then 30 g of trichlorofluoromethane are added. A stable microemulsion is obtained by simple agitation.

EXAMPLE 18

There is mixed with 90 g of the halogenated polyhydroxylated compound of Example 4, 10 g of dimethylmethylphosphonte and 10 g of nonylphenol oxyethylenated with 1.5 ethylene oxide configurations. Homogenization takes place and then 30 g of trichlorotrifluoroethane (Freon 113) are added. A stable microemulsion is obtained by simple agitation.

EXAMPLE 19

There is mixed with 90 g of the halogenated polyhydroxylated compound of Example 4, 10 g of dimethylmethylphosphonate and 10 g of ethylhexanol oxyethylenated with 10 ethylene oxide configurations. Homogenization takes place and then 30 g of trichlorotrifluoroethane are added. A stable microemulsion is obtained by simple agitation.

EXAMPLE 20

There is mixed with 100 g of the polyhydroxylated compound of Example 4, 4.5 g of ethyl hexanol oxyethylenated with 1.5 ethylene oxide configurations, 1 g of water, 1.5 g of dimethylcyclohexylamine, and 1.5 g of silicon (silicon 8404). The mixture is homogenized and then 25 g of trichlorofluoromethane are added. A stable microemulsion is obtained by simple agitation. A fire-resistant rigid polyurethane foam is fabricated from this microemulsion by the addition of 118 g of crude MDI (BLD 150). A foam is obtained which possesses the following characteristics:

Density: 31.8 g/l Standard NF56107
Resistance under compression parallel direction: 109 KPa: Standard NF56101
Resistance under compression perpendicular direction: 100 KPa: Standard NF56101
16 Oxygen Index: 29.1: Standard NF51071

EXAMPLE 21

There s mixed with 100 g of the polyhydroxylated compound of Example 1, 6 g of ethylhexanol oxyethylenated with 1 ethylene oxide configurations, 1 g of water, 5 g of dimethyl methylphosphonate, 1 g of dimethylcyclohexylamine, and 1.5 g of silicon (silicon 8404). The mixture is homogenized and then 25 g of trichlorofluoromethane are added. A stable microemulsion is obtained by simple agitation. A fire-resistant rigid polyurethane foam is fabricated from this microemulsion by the addition of 135 g of crude MDI (BLD 150). A fire-resistant rigid foam is obtained which possesses the following characteristics according to the same standards as Example 20.

Density: 32.3 g/l
Resistance under compression parallel direction: 154 KPa
Resistance under compression perpendicular direction: 96 KPa
Oxygen Index: 29.4

EXAMPLE 22

There is mixed with 100 g of the polyhydroxylated compound of Example 2, 5 g of an alcohol with a carbon chain containing $C_{13}$–$C_{15}$, oxyethylenated with 2 ethylene oxide configurations, 10 g of trichloroisopropylphosphate, 1 g of water, 1 g of dimethylcyclohexylamine, and 1.5 g of silicon (silicon 8404). The mixture is homogenized and then 25 g of trichlorofluoromethane are added. A microemulsion is obtained by simple agitation. A fire-resistant rigid foam is fabricated from this microemulsion by the addition of 120 g of crude MDI (BLD 150), which has the following characteristics according to the same standard as Example 20:

Density: 40 g/l
Resistance under compression parellel direction: 163 KPa
Resistance under compression perpendicular direction: 83 KPa
Oxygen index: 31.3

EXAMPLE 23

(COMPARATIVE EXAMPLE)

There is mixed with 100 g of the polyhydroxylated compound of Example 1, 1 g of water, 5 g of dimethylmethylphosphonate, 1 g of dimethylcyclohexylamine, 1.5 g of silicon (silicon 8404), and 25 g of trichlorofluoromethane. Homogenization takes place under strong agitation. As soon as agitation is ceased, a very clear separation of the trichlorofluoromethane from the other constituents is observed.

By the addition of 135 g of crude MDI (BLD 150), a rigid polyurethane foam of poor quality was obtained on which it was not possible to determine the usual physical characteristics.

EXAMPLE 24

(COMPARATIVE EXAMPLE)

There is mixed with 100 g of the halogenated polyhydroxylated compound of Example 2, 1 g of water, 1 g of dimethylcyclohexylamine, 1.5 .g of silicon (silicon 8404), 20 g of trichloroisopropylphosphate and 25 g of trichlorofuloromethane. Homogenization takes place under strong agitation. As soon as agitation was stopped, a very clear separation of the trichlorofluoromethane from the other constituents was observed.

By the addition of 135 g of crude MDI (BLD 150), a rigid polyurethane foam of poor quality was obtained on which it was not possible to determine the usual physical characteristics.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A stable homogeneous composition in the form of a microemulsion suitable for making polyurethane and/or polyisocyanurate rigid foams consisting essentially of a halogenated polyhydroxylated compound, a halogenated alkane, and a surfactant in an amount sufficient to maintain a stable microemulsion.

2. The composition of claim 1 wherein the surfactant is selected from non-ionic surfactants, anionic or cationic surfactants, or amphoteric surfactants.

3. The composition of claim 1 or 2 consisting of a halogenated polyhydroxylated compound, a halogenated alkane, surfactant in an amount sufficient to maintain a stable microemulsion, phosphated or phosphohalogenated fireproofing agents, a catalyst for accelerating foam formation, and an agent to dimensionally stabilize the foam.

* * * * *